United States Patent [19]

Kagayama

[11] 4,017,151

[45] Apr. 12, 1977

[54] BICYCLE SIDE REFLECTOR

[75] Inventor: Jo Kagayama, Osaka, Japan

[73] Assignee: Tsuyama Mfg. Co., Ltd., Osaka, Japan

[22] Filed: Nov. 3, 1975

[21] Appl. No.: 628,556

[52] U.S. Cl. .................................. 350/99; 350/103
[51] Int. Cl.² .......................................... G02B 5/12
[58] Field of Search ............. 350/99, 97, 103, 299; 301/37 SA; D10/106, 111

[56] References Cited

UNITED STATES PATENTS

| | | | |
|---|---|---|---|
| 2,344,542 | 3/1944 | Fike | 350/99 |
| 3,854,777 | 12/1974 | Kennedy | 301/37 SA |
| 3,854,777 | 12/1974 | Kennedy | 301/37 SA |
| 3,887,268 | 6/1975 | Golden et al. | 350/102 |
| 3,894,786 | 7/1975 | Nagel | 350/99 |
| 3,924,928 | 12/1975 | Trimble | 350/97 |
| D237,367 | 10/1975 | Amoroso | D10/6 |
| D237,368 | 10/1975 | Disbrow et al. | D10/111 |

Primary Examiner—Paul A. Sacher
Assistant Examiner—B. W. delos Reyes
Attorney, Agent, or Firm—Seymour Rothstein

[57] ABSTRACT

This invention embodies a side reflector assembly adapted to be mounted on the spokes of a bicycle wheel or the like, such assembly including two slim elongated bodies bonded together. Each body has a front reflective surface comprised of at least a first planar surface and a second roof-like surface having two inclined planar sections symmetrical to the longitudinal axis of the assembly. Bolt and nut means are provided for clamping the assembly onto the wheel spokes.

8 Claims, 8 Drawing Figures

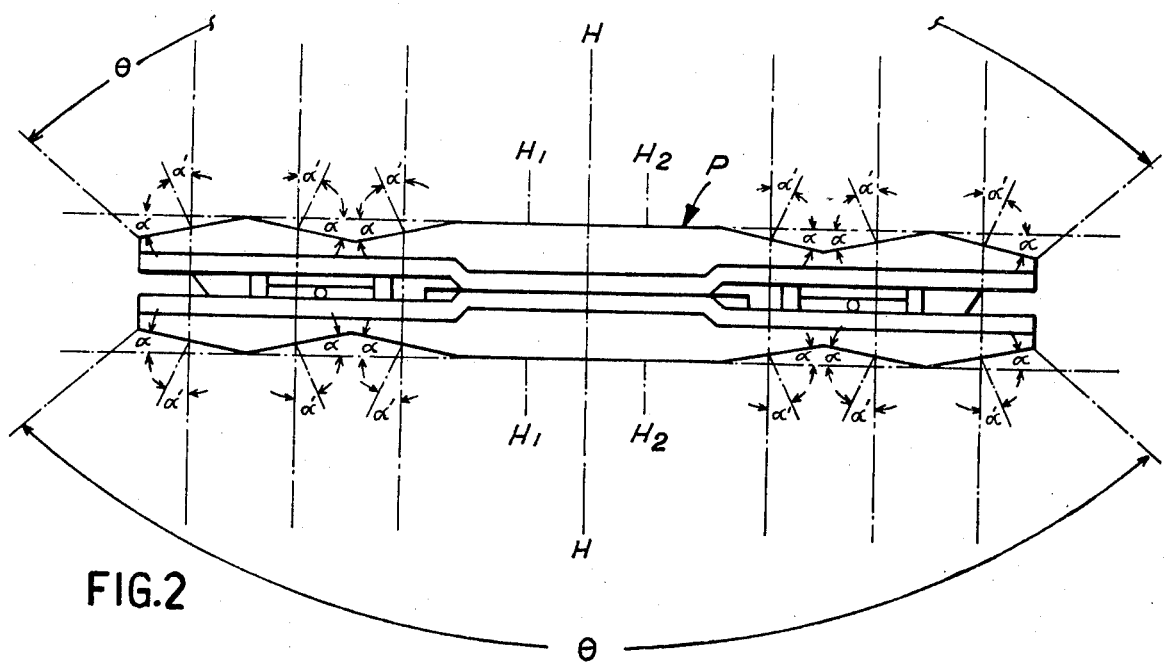
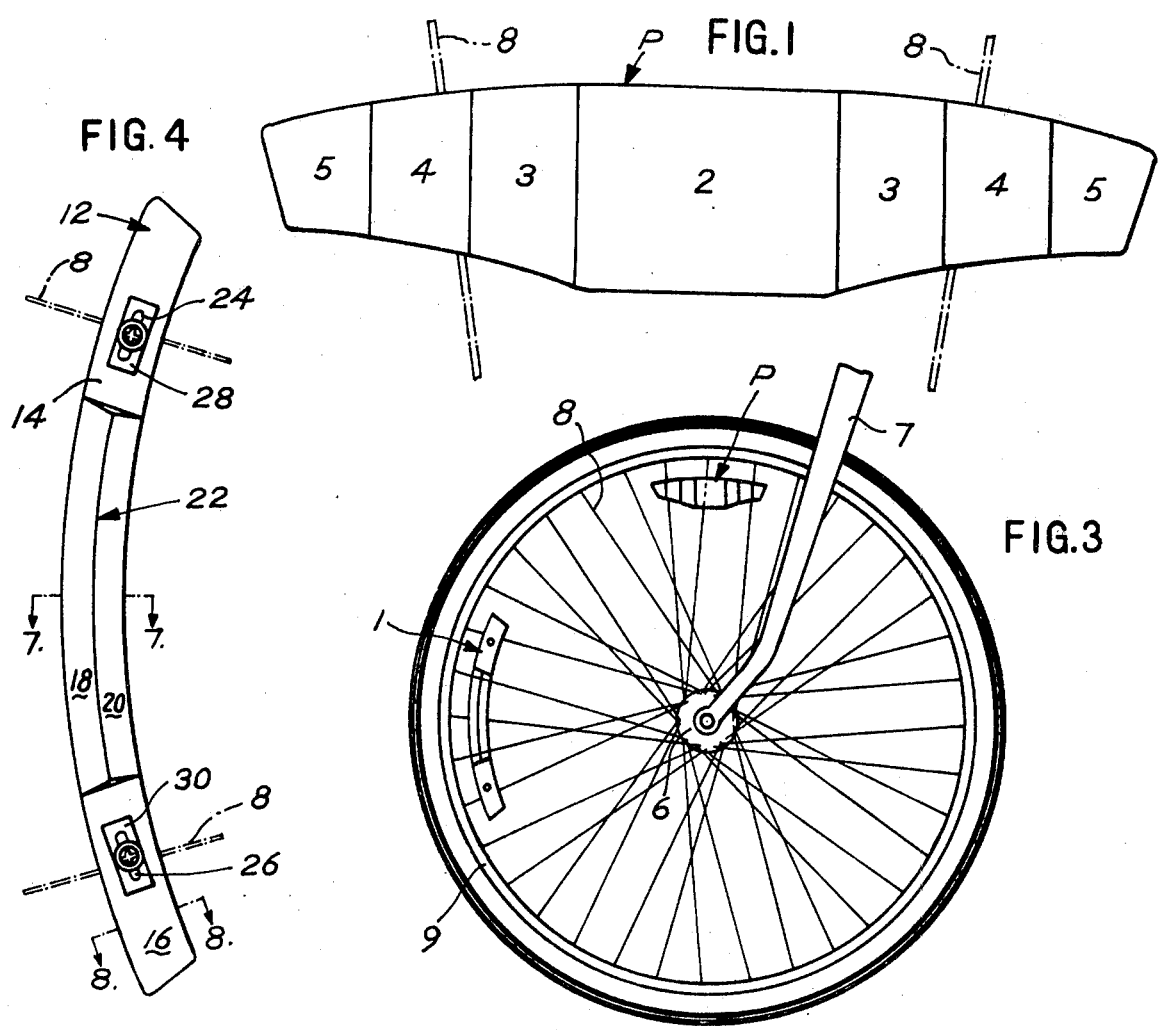

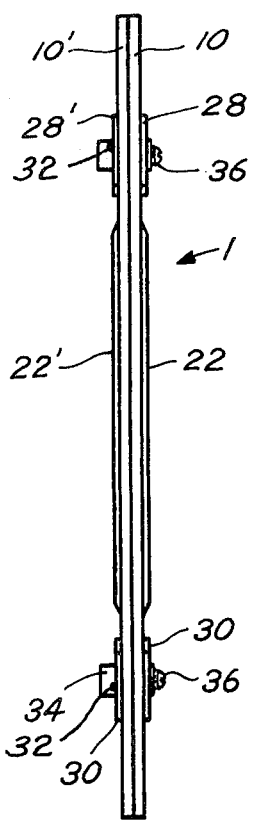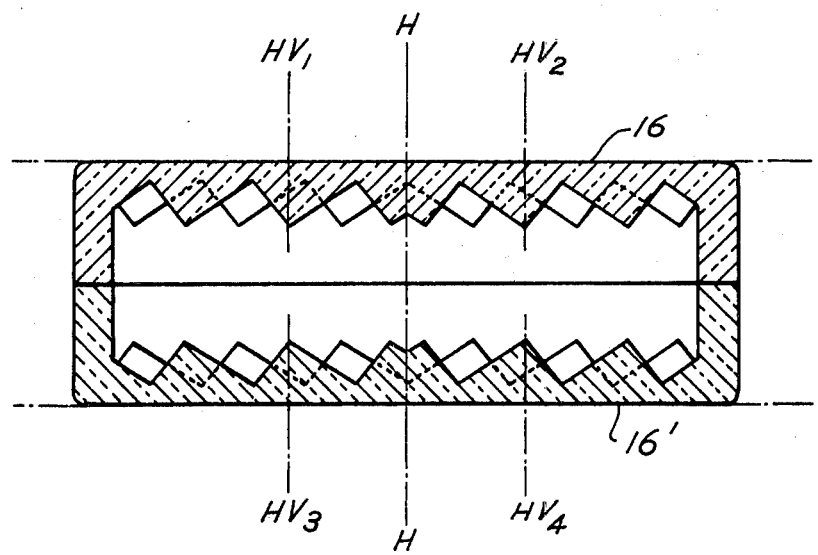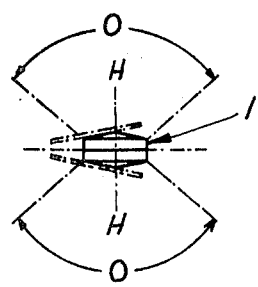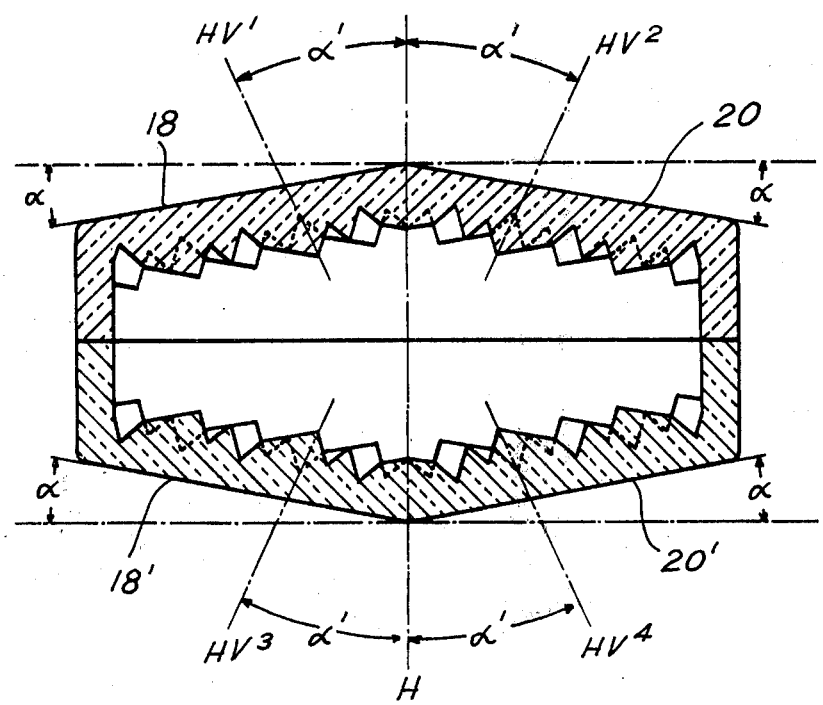

BICYCLE SIDE REFLECTOR

BACKGROUND OF THE INVENTION

This invention relates to a side reflector for bicycles and like vehicles and, more particularly, to a side reflector adapted to be securely mounted on the spokes of a bicycle or the like wheeled vehicle.

A principal object of the invention is to provide an improved side reflector for a bicycle or like vehicle adapted to be mounted on the spokes of the wheel of the bicycle and having the ability to advantageously receive incident light and reflect same during all angles of rotation of such wheel.

A second object of this invention is to provide an improved bicycle side reflector having the thickness between its two opposed front reflective surfaces comparatively small and the longitudinal axis thereof disposed parallel or substantially parallel with respect to the inner diameter of the rim of the wheel upon which the side reflector is mounted, such side reflector being constructed and arranged so that it can be mounted upon the wheel spokes and fixedly clamped thereto.

A third object of this invention is to provide an improved narrow, elongated side reflector adapted to be mounted securely to the spokes of a wheel and constructed and arranged for synthesizing an effective incident angle by the combination of front reflective surfaces having the optical axes of prismatic reflector elements normal thereto, some front reflective surfaces inclined relative to others, the inclined surfaces comprising planar surfaces extending generally parallel to the inner diameter of the rim of the wheel and with the optical axes of the prismatic reflector elements on the inclined surfaces inclined outwardly more than 90° relative to the front reflective surfaces thereof, so that incident light can be reflected therefrom in a wide external angle.

BRIEF DESCRIPTION OF THE DRAWING

There is shown in the attached drawing a presently preferred embodiment of the present invention wherein:

FIG. 1 is a right side view of a prior art side reflector;

FIG. 2 is a front view of the prior side reflector;

FIG. 3 is a view showing a side reflector of the present invention and a side reflector of FIGS. 1 and 2 mounted upon a spoked wheel of a bicycle or like vehicle;

FIG. 4 is a right side view of a side reflector shown embodying principles of the present invention;

FIG. 5 is a front view of the side reflector of FIG. 4;

FIG. 6 is a view showing a working mode of the side reflector of FIG. 5;

FIG. 7 is an enlarged section view of the side reflector taken on line 7—7 of FIG. 4; and FIG. 8 is an enlarged section view of the side reflector taken on line 8—8 of FIG. 4.

DETAILED DESCRIPTION OF THE PRESENT INVENTION

A prior art side reflector is known which is designed to receive and reflect light while mounted on spokes extended generally tangentially from a wheel hub. FIGS. 1 and 2 represent a prior art side reflector P, a mounting mode of which is shown in FIG. 3. According to this known side reflector, the front reflective surface as viewed in FIG. 2 has a wing form. The middle portion 2 thereof is a first generally flat plane. The prismatic reflector elements formed on the back of the middle portion have their optical axes disposed along the lines H, $H_1$, $H_2$, ... normal to the front surface of the middle portion 2. The two side portions of this representation of reflector have triangular wave or wing sections. As viewed in FIGS. 2, the respective generally flat front surfaces of the triangular wave sections 3, 4, and 5 are inclined by angle $\alpha$. The prismatic reflector elements formed on the back of the respective front inclined surfaces 3, 4 and 5 have their optical axes inclined outwardly by an angle $\alpha'$ to the lines parallel with the line H normal to the front surface of the middle portion 2. It is generally known that prismatic reflector elements function to effectively reflect incident light up to 25° from the respective optical axes of the reflector elements as midpoints and enjoy directive nature. This angle is called an effective incident angle. Inasmuch as the shown reflector is unable to receive incident light in a wider angle than 25° from its front horizontal surface alone, the reflector elements on the rear of the other inclined front surfaces 3, 4 and 5 are disposed with their optical axes further inclined outwards to the lines normal to said other inclined surfaces. In order that the oppositely faced front surfaces of the reflector are not contacted by the fork 7 of the bicycle during rotation of the wheel carried thereon, the reflector must be narrow from one side to the other side. Taking this into consideration, the inclination angle is critical at about 6° – 12°. As the result, 25° is added to $\alpha'$, so that angle $\theta$ over the entire front surface can function as an effective incident angle. The so-defined angle $\theta$ is required to be at least 100° by the safety standards of the U.S. Consumer Product Safety Commission (CPSC).

Wheel mounted reflectors are designed to receive incident light among spokes 8 extended immediately above and below a wheel hub 6. During rotation, the reflector will be located below the wheel hub 6 near the ground and will reflect light poorly. This defect will occur in prior art round or circular reflectors as well as the prior art reflector of FIGS. 1 and 3.

When the shown prior art reflector is disposed immediately above or immediately below the wheel hub, there will be an additional effective incident angle of 25° on one side and of 50° on the two sides. However, when the prior art reflector is located below the wheel hub as a result of rotation of the wheel, the foregoing feature is greatly reduced because of the proximity of the reflector to the ground. The reflector will be below the normal beam of light and therefore, will be relatively ineffective when in this position. The reflector of this invention is designed to have the so defined additional effective incident angle when disposed nearly at the two sides of the wheel hub. Also, reflectivity is enhanced when the reflector is in a position below the wheel hub.

A preferred embodiment of this invention is better shown in FIGS. 4–8. Side reflector 1 according to this invention has two reflector bodies 10, 10' formed from acrylic resin in an elongated and arched form corresponding generally to the inner diameter of a wheel rim. Two reflector bodies 10, 10' are opposed and sealed by ultrasonic sealing apparatus to have their front reflective surfaces exposed and their rear faces, which are faceted with prismatic reflector elements, enclosed. As shown in FIG. 4, the front reflective surface of reflector body 10 includes horizontal planar surfaces 14, 16 on the upper and lower portions thereof, and a roof like surface 22 on the middle portion thereof having two planes 18, 20 inclined symmetrically downwards by angle α with reference to the normal line H of the longitudinal axis thereof. Horizontal planar surfaces 14, 16 are formed with respective through holes 24, 26 in a track or slot shape for application of spoke clamping means hereinafter described. Elongated seats 28, 30 are formed along the respective margins of through holes 24, 26. The reflector elements which horizontal planar surfaces 14, 16 have formed on the back thereof have optical axes disposed along the lines $HV_1$, $HV_2$, ... normal to said planar surfaces. The other reflector elements which inclined planes 18, 20 have formed on the back thereof have optical axes inclined outwards by angle α′ with reference to normal line H of the longitudinal axis thereof. In this embodiment, angle α is defined as 10° and angle α′ is defined as 25°.

Over the horizontal planar surfaces 14, 16 there is an effective incident angle of 25° from the optical axes $HV_1$, $HV_2$ ... of the pertinent reflector elements to the both sides. Also, over roof planar surfaces 22 there is an effective incident angle of 25° from the optical $HV^1$, $HV^2$, ... of the pertinent reflector elements to the both sides. As a consequence, by combination of horizontal planar surfaces 14, 16 with roof planar surface 22, an effective incident angle is acknowledged at 50° at each side for a total included angle of 100°. The determination of 10° as the inclination angle downwards from the normal line of the longitudinal axis to sloped planes 18, 20 is to comply with the fact that spokes are inclined outwards by about 6°–12° from the circumferential axis of wheel rims in the inner diameter. It is, therefore, assured that the reflector body defined above can be clamped to the spokes and located upwards near the inner diameter of the wheel rims, to meet the requirement of said U.S.C.P.S.C. that the longitudinal axis of mounted reflectors shall lie within three inches of the inner diameter of wheel rims.

In connection with the requirement that the area of the front surfaces shall be at least 6 square inches, the reflector body according to this invention meets the area requirement, is slim and is in an elongated form, and preferably is arched in order to afford a light and aesthetically pleasing feeling to the viewers.

The elongated side reflector 1 having planar surfaces adjacent the ends and an intermediate roof-like portion comprised of planar surfaces inclined symmetrically with respect to the longitudinal axis of side reflector 1 will reflect light throughout 360° rotation of the side reflector 1, and even when the side reflector is disposed at a 6 o'clock position (below the wheel hub) and close to wheel rim 9.

Spoke clamping means shown in FIGS. 4 and 5, comprise a nut 34 having a cavity 32 for grasping a spoke and a screw 36 in a known mode. Screws 36 are passed through holes 24, 26 of front horizontal planar surfaces 14, 16. Nut 34 is threaded onto a screw 36 and cavity 32 receives a spoke, resulting in fixed mounting of a reflector on cooperating spokes of a bicycle wheel (FIGS. 3 and 4). It will be noted by references to FIG. 3 that the inner and outer edges of the side reflector 1 are generally parallel to one another and to the inner rim of the spoked wheel of the bicycle.

While there has been described a presently preferred embodiment of the invention, it will be obvious that other embodiments will be apparent to those skilled in the art. It is, therefore, intended that the invention be limited only within the scope of the appended claims.

I claim:

1. A side reflector assembly for mounting on spokes of a wheel comprising two slim and elongated reflector bodies having a longitudinal axis adapted to be oriented generally parallel to a rim of a wheel upon which the reflector assembly is to be mounted, each reflector body made from molded material and each having a front reflective surface and a rear face faceted with prismatic reflector elements, said bodies being seamed together to form said assembly, said front reflective surface being comprised of at least a first planar surface and a second roof surface having two inclined planar sections symmetrical to the longitudinal axis of the assembly, and means for clamping said assembly to a wheel spoke.

2. A side reflector assembly as in claim 1 wherein the reflector bodies are arched.

3. A side reflector assembly as in claim 1 wherein the bodies are made from acrylic resin.

4. A side reflector assembly as in claim 1 wherein the inclined planar sections of the roof surface are inclined by 6° to 10° symmetrically to the longitudinal axis.

5. A side reflector assembly as in claim 1 wherein the bodies have aligned holes therein and the clamping means include a bolt extending through said holes and cooperating with a nut for affixing said assembly to a spoke.

6. A side reflector assembly as in claim 5 wherein the nut includes a cavity for receiving a spoke therein.

7. A side reflector assembly as in claim 5 having a pair of spaced apart through holes, with a bolt in each and a nut secured to each bolt, each nut having a cavity for receiving a spoke.

8. A bicycle side reflector assembly comprising two slim elongated reflector bodies in an arched form, said bodies each being made from acrylic resin having a front reflective surface and a rear face faceted with prismatic reflector elements, said bodies being seamed together and forming a longitudinal axis adapted to be disposed generally parallel to the rim of the wheel upon which the reflector assembly is to be mounted, said front reflective surface comprising planar surfaces at each end with respective through holes and a middle roof planar surface having two planes inclined by 6° to 10° symmetrically to the longitudinal axis, wherein the optical axes of said reflector elements on the back of each of said planar surfaces are disposed along lines normal to said surfaces and the optical axes of said reflector elements formed on the back of said middle roof surface are inclined outwards by 25° to the normal line of the longitudinal axis; and clamping means for securing said seamed together bodies to spokes of a bicycle wheel, said clamping means including a bolt and a nut having a spoke-retaining cavity, said bolt extending through a through hole.

* * * * *